United States Patent [19]
Allert

[11] 3,875,492
[45] Apr. 1, 1975

[54] CONTROL UNIT FOR A CONVERTER
[75] Inventor: Erich Allert, Vienna, Austria
[73] Assignee: Siemens Aktiengesellschaft Osterreich, Vienna, Austria
[22] Filed: Apr. 15, 1974
[21] Appl. No.: 460,976

[30] Foreign Application Priority Data
Apr. 13, 1973 Germany............................ 2318806

[52] U.S. Cl................ 321/16, 307/228, 307/269, 321/40, 321/41, 328/74, 331/153
[51] Int. Cl. ........................................... H02m 1/08
[58] Field of Search ........... 307/228, 231, 234, 265, 307/269; 328/63, 74, 146, 147; 321/16, 18, 40, 41; 331/153

[56] References Cited
UNITED STATES PATENTS
3,243,689 3/1966 Perrins............................ 323/22 SC
3,648,078 3/1972 Galloway......................... 307/265
3,792,339 2/1974 Kublick........................... 321/40

*Primary Examiner*—William H. Beha, Jr.
*Attorney, Agent, or Firm*—Kenyon & Kenyon Reilly Carr & Chapin

[57] ABSTRACT

An improved control unit for an inverter, which control unit includes an R-C arrangement used as a synchronizable sawtooth voltage generator, a comparator having the sawtooth voltage as its inverting input and a control voltage as its non-inverting input with positive and negative feedback provided from the output to the input of the comparator thereby causing the comparator to act as an oscillator once the sawtooth voltage exceeds the control voltage thereby allowing long and short pulses developed to be changed into pulse trains or pulse series. The design is such that the feedback can be connected and disconnected and furthermore that a differentiating capacitor can be connected in or bypassed, thereby giving the control unit the capability of providing long pulses, short pulses, long trains of pulses or short trains of pulses. As a result, a mass produced control unit can be used with various types of equipment by connecting and disconnecting the proper soldered jumpers.

10 Claims, 2 Drawing Figures

CONTROL UNIT FOR A CONVERTER

BACKGROUND OF THE INVENTION

This invention relates to control units for converters in general, and more particularly to an improved control unit which is designed to have versatility in the types of outputs which can be provided thereby permitting a single control unit to be used with various types of equipment.

Control units are commercially available in which a sawtooth voltage generator using an R-C circuit and which is capable of being synchronized by means of a synchronizing voltage is provided as one input to an operational amplifier used as a comparator with the other input of the operational amplifier coupled to a control voltage. In an arrangement of this nature, once the sawtooth voltage reaches the level of the control voltage, the comparator output changes thereby providing a pulse which may be used in a converter. Depending on the type of converter circuit and the load circuit, different types of control pulses are used. In general, the types of pulses used have been divided between long pulses and short pulses. The pulses being referred to herein are the pulses used to fire controlled rectifiers such as thyristors in the converter. It is possible to use short pulses as long as, on the load circuit side of the converter controlled rectifiers, the converter carries sufficient current at the end of the short pulse so as to remain in the conduction state. This is the case, for example, when the load circuit is an ohmic load. On the other hand, circuits having a high inductance in the load circuit generally must be triggered by long pulses. It is also customary to break up the long or short pulses into pulse trains. Such pulse trains can be more easily transmitted by pulse transformers and the same type and same advantages of operation as result from a single short or long pulse results. The type of circuit described above wherein the comparator output changes when the sawtooth voltage exceeds the control voltage will generate a long pulse. That is, the level will change and remain at the changed level until the sawtooth voltage is reset. In order to obtain short pulses, a comparator of this nature can be followed by a differentiator such as a capacitor. However, this circuit by itself can provide only long and short pulses and is not suited for generating pulse trains, which are also referred to in the art as long and short pulse series. Thus, in applications where pulse trains or pulse series are desired, additional equipment must be provided.

Thus, it can be seen that it is desirable that a unit of this nature have the capability of providing not only long and short pulses but also long and short pulse trains.

SUMMARY OF THE INVENTION

The present invention provides such a control unit. The type of circuit described above is provided in conventional fashion to generate long and short pulses. According to the present invention, however, this circuit is modified to provide in addition, the capability of generating pulse trains. To accomplish this, the control voltage is provided to the non-inverting input of the comparator as before. The sawtooth voltage in addition to being directly connected to the inverting input, is also connected to the non-inverting input through a diode. This connection of the sawtooth voltage is through a removable jumper so that operation both in the single pulse and pulse train mode is possible. In addition, the output of the comparator is fed back through a capacitor to the non-inverting input and is also fed back through a further series circuit comprising a capacitor and resistance to the inverting input. The feedback is also adapted to be selectively connected and disconnected through the use of an appropriate jumper.

With the jumpers in place coupling the sawtooth voltage to the non-inverting input and providing feedback to the inverting and non-inverting input, the comparator in addition to detecting the point at which the sawtooth voltage exceeds the control voltage also acts as an oscillator for generating pulse trains. Thus, this arrangement is not only technically advantageous but is particularly economical since a single circuit can provide both long and short pulses and long and short pulse trains without additional circuitry. In the illustrated embodiment, the output of the comparator is coupled to a capacitor differentiating circuit which also contains jumpers so that it can be inserted or bypassed depending on whether short or long pulses or pulse trains are required.

The illustrated embodiment also includes means for synchronizing the sawtooth generator. In this illustrated embodiment, a synchronizing voltage is rectified and provided to a second R-C circuit from which it is fed through a diode to one input of a NAND gate. The tap between the capacitance and resistance in this circuit is coupled through an inverter to the second input of the NAND gate with the NAND gate output coupled to the junction of the resistor and capacitor in the sawtooth generator R-C circuit. This circuit which is used in resetting the sawtooth generator avoids premature resetting which could be triggered by commutation dips and the like if the gating illustrated was not provided. This gating which filters out disturbances such as those caused by commutation breaks beyond zero eliminates the need for expensive additional circuits without having any detrimental effect on the angular accuracy of the firing pulses. In the illustrated embodiment for a two-pulse inverter, two synchronizing voltages phase shifted by 180° are shown fed to a rectifier in a center-tap circuit.

Also shown is a pulse filter for interference suppression. In this arrangement, the output of the comparator is provided to one input of an AND gate and a further R-C circuit provided having its tap coupled to a second input of the AND gate through an appropriately poled diode. A third input to the AND gate is coupled to a synchronizing voltage. In the illustrated two-pulse control unit, two AND gates are provided, each having an associated R-C circuit comprising a resistor, a capacitor, and a second resistor in series. The free end of one resistor in each of the circuits is coupled to a positive voltage and the other side to the negative voltage. One of the synchronizing voltages is coupled to the junction between the capacitor and resistor on the positive side through an appropriately poled diode with that same junction coupled as one input to the first AND gate. The second junction in this circuit, i.e., the one on the negative side is coupled to the second AND gate. Similarly, the other synchronizing voltage is coupled through a diode to the tap on the positive side of the second R-C circuit with that same point coupled to the second AND gate. The other tap on this second R-C circuit, i.e., on the negative side, is then coupled to the first AND gate.

DETAILED DESCRIPTION OF THE PREFERRED EMBODIMENT

Figure 1:
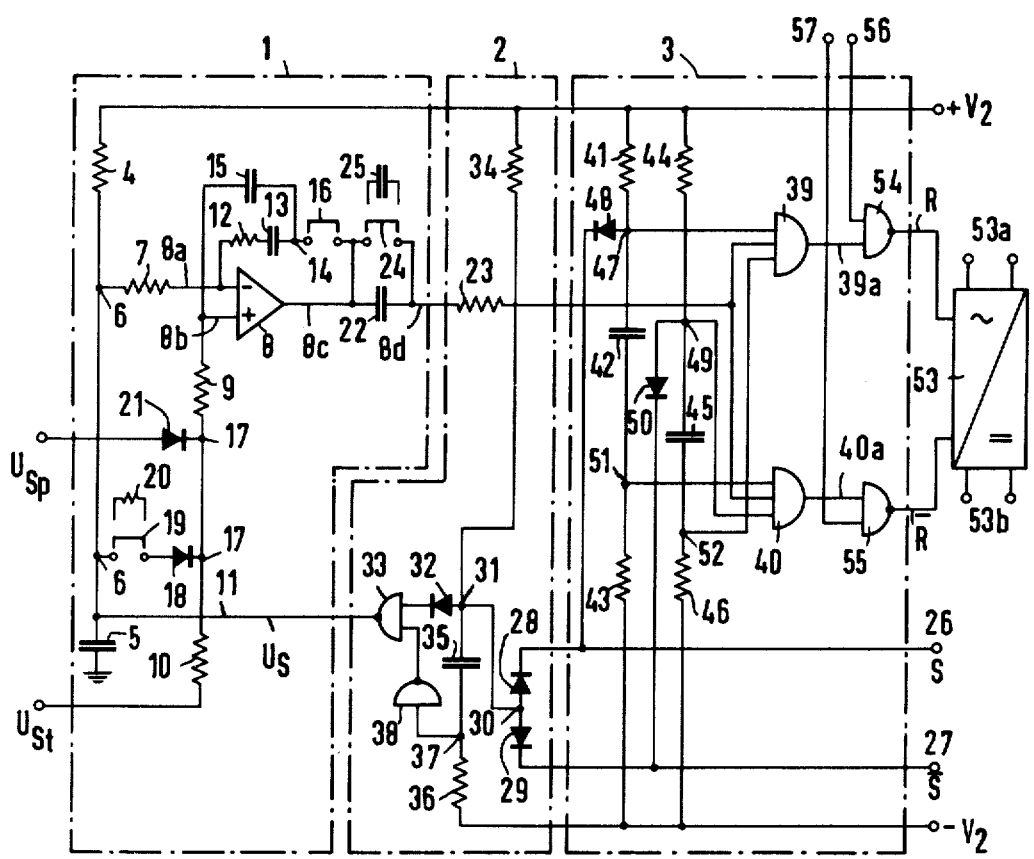
FIG. 1 is a schematic diagram of a control unit of the present invention.

FIG. 1 shows an embodiment of a control unit of the present invention for use in a two-pulse converter arrangement. In general terms, the control unit includes a module 1 for generating a sawtooth voltage and for generating the necessary pulses or pulse trains; a module 2 for synchronizing the sawtooth voltage; and a module 3 used for pulse selection and the supression of interference.

Within the module 1 a sawtooth voltage generator is provided comprising an R-C circuit made up of resistor 4 and capacitor 5, which is coupled between the positive voltage $+V_2$ and ground. The voltage at the junction 6 between the resistor and capacitor is provided through a resistor 7 to a lead 8a coupled to the inverting input of an operational amplifier 8 configured as a comparator. A control voltage $U_{st}$ is coupled through resistors 9 and 10 to the lead 8b at the non-inverting input of the comparator 8. Neglecting for the moment the remaining circuits associated with the module 1, if the sawtooth voltage at junction point 6 exceeds the control voltage $U_{st}$, a pulse will be generated at the output of the comparator 8 on line 8c. The junction point 6 between the resistor 4 and capacitor 5 is also coupled via a line 11 to the synchronizing module 2. In a manner to be described below, a synchronizing output $U_s$ will be provided on this line for resetting the sawtooth generator. A first feedback arrangement comprising a resistor 12 and capacitor 13 in series is shown coupled between a terminal 14 and the inverting input of comparator 8. A second feedback path is shown in which the terminal 14 is coupled through a capacitor 15 to the non-inverting input of comparator 8 at line 8b. A jumper 16 is illustrated which can be used to couple the junction 14 to the output line 8c of the comparator 8 in order to couple the feedback arrangement into the circuit. With the jumper in place, negative feedback will be provided through resistor 12 and capacitor to the inverting input and positive feedback through the capacitor 15 to the noninverting input of comparator 8.

At the junction point 17 between resistors 9 and 10, a diode 18 is provided having its cathode coupled to the junction point and having its anode available to be coupled through a removable jumper 19 to the junction point 6 at which the sawtooth voltage appears. In addition there is shown, an input terminal coupled through a diode 21 to junction point 17. On this terminal, a voltage $U_{st}$ may be impressed as a blocking voltage to control the blocking and releasing of the pulses of the control unit.

The output line 8c of the comparator 8 is coupled to a capacitor 22. A jumper 24 is provided for selectively bypassing the capacitor 22. Also shown is a further capacitor 25 which may be placed in parallel with capacitor 22 rather than placing the jumper there across.

Different functions can be provided at the output of module 1 which appears on line 8d. The first possibility is that obtained with the jumper 24 in place. In that case, no feedback and no differentiation is provided and the output of comparator 8 will be a long pulse. Without the jumper 24 or with the capacitor 25 in place rather than jumper 24, differentiation takes place and the output on line 8d will comprise short pulses. If it is desired to generate pulse trains or serial pulses, the jumpers 16 and 19 are inserted or, in place of the jumper 19, a resistor 20 inserted. With these connections made, the voltage at the non-inverting input 8b is pulled up by the sawtooth voltage through the diode 18 once the sawtooth voltage reaches the magnitude of the control voltage $U_{st}$. The negative and positive feedback of the comparator 8 cause it to act as an oscillator and provide a pulse train output on line 8c as long as the sawtooth voltage is larger than the control voltage $U_{st}$. Thus, the pulse train will be generated until the sawtooth voltage is reset by a synchronizing voltage input $U_s$. If the jumper 24 is in place, a long pulse train will be provided. If the capacitor 22 is not shorted, then short pulse trains will be provided at the output 8d, then the resistor 20 is inserted rather than the jumper 19.

Thus, with one simple basic building block, four different types of pulses can be generated with the control unit according to the present invention. Selection of the type of pulse output to be provided may be made in a simple manner by soldering the proper terminals on a circuit board on which the components are mounted, i.e., it is only necessary to solder in the desired ones of jumpers 16, 19 and 24 or resistor 20 or capacitor 25 in the proper arrangement to obtain the desired type of pulse output. As a result, control unit which is well suited for mass-production and allows various applications is provided. The synchronizing unit contained within module 2 is used for resetting the sawtooth voltage generator of module 1 and at the same time filtering out any commutation breaks occuring in the synchronizing voltage. Two gating voltages designated S and $\overline{S}$ are provided respectively at terminals 26 ans 27. These two voltages are shifted in phase by 180°. They are fed in through respective diodes 28 and 29 to a common junction point 30. Point 30 is coupled to the junction 31 of an R-C circuit comprising resistor 34, capacitor 35 and resistor 36 coupled between the positive voltage $+V_2$ and the negative voltage $-V_2$. Junction point 31 is coupled through a diode 32 to one input of a NAND gate 33. The second input to NAND gate 33 is provided from the output of an inverter 38 having its input coupled to the second junction point 37 between the capacitor 35 and resistor 36. The output of NAND gate 33 is coupled to line 11 and provides the reset voltage $U_s$ for resetting the sawtooth generator. Resetting of the sawtooth generator made up of resistor 4 and capacitor 5 takes place after each halfwave of the timing voltage S. At that point, synchronizing pulse $U_s$ will be provided at the output of NAND gate 33. This synchronizing pulse $U_s$ can occur only at the end of a half-wave of the timing voltage S and disturbances due to commutation breaks beyond zero are impossible. As a result, further filtering of the timing or synchronizing voltage S is not necessary and the expensive circuits normally associated therewith need not be provided. The output of module 1 on line 8d is coupled through a resistor 23 to the module 3 which is used as a pulse selection circuit and for the supression of interference pulses. The output through resistor 23 is coupled as one input to an AND gate 39 and to a second AND gate 40. In module 3, two additional R-C circuits are provided. One of these comprises the series combination of resistor 41, capacitor 42 and resistor 43 coupled between the positive voltage $+V_2$ and the negative voltage $-V_2$. The second circuit is made up of a similar series combination of resistor 44, capacitor 45 and resistor 46, also coupled between the positive and negative voltages. The synchronizing voltage S at terminal 26 is coupled through a diode 48 to a junction point 47 between resistor 41 and capacitor 42, which junction is also connected as a second input to the AND gate 39. Similarly, the synchronizing voltage $\overline{S}$ at terminal 27 is coupled through a diode 50 to the junction point 49 between resistor 44 and capacitor 45, which point is then connected as a second input to AND gate 40. The third input to AND gate 39 is from the junction 52 between capacitor 45 and resistor 46. Similarly, the third input to AND gate 40 is from the junction 51 between the capacitor 42 and resistor 43. Thus, as can be seen, the junctions of the R-C circuits which are coupled to the AND gates 39 and 40 are at different potentials, i.e., positive or negative depending on the voltages $+V_2$ and $-V_2$ on the different sides of capacitors 42 and 45.

The outputs 39a and 40a of AND gates 39 and 40 will have thereon respective pulse trains R and $\overline{R}$ where $\overline{R}$ is inverted with respect to R. This logic circuitry not only generates these mutually inverted pulse trains but also supresses interference pulses which may occur in the timing voltage or power supply. The pulse trains R and $\overline{R}$ are provided as outputs for triggering the thyristors of a rectifier designated 53. This rectifier in conventional fashion will have an a-c voltage at its input terminals 53a and will provide a d-c output voltage on its terminals 53b. In the illustrated embodiment, NAND gates 54 and 55 are provided between the outputs 39a and 40a and the inputs to the rectifier 53. This arrangement may be used where the rectifier is a six pulse bridge circuit with a pulse train shifted in phase by 60° relative to the pulse trains R and $\overline{R}$ provided on the terminals 56 and 57 in order to generate double pulses.

Figure 2:
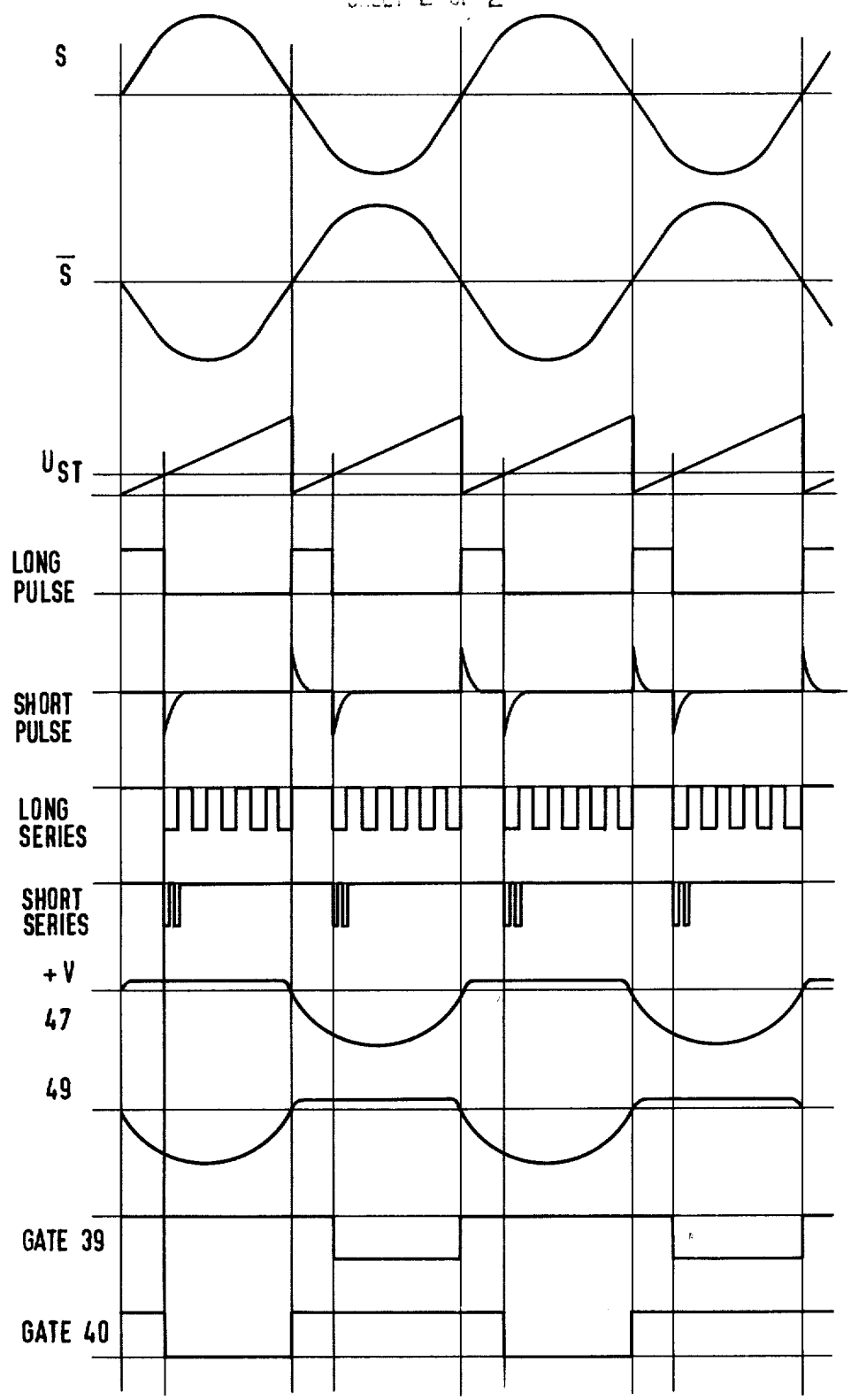
FIG. 2 is a wave-form diagram helpful in understanding the operation of FIG. 1.

FIG. 2 illustrates various wave-forms associated with the circuit of FIG. 1. Shown are the two synchronizing waveforms S and $\overline{S}$ which may be obtained from the system a-c line. The sawtooth voltage generated in module 1 is illustrated and with the same illustration, the voltage $U_{st}$. As illustrated, for each zero crossing of the wave-forms S and $\overline{S}$, the sawtooth generator is reset. Also shown is the generation of long pulses beginning at the time when the sawtooth crosses the voltage $U_{st}$ and ending when the sawtooth is reset. It should be noted that the outputs of the comparator 8 such as the long pulse are negative or inverted outputs since an inversion takes place due to the sawtooth being provided to the inverting input. Also shown are short pulses resulting from the insertion of capacitor 25 and long and short pulse trains obtained by inserting the appropriate jumpers as described above. The logic elements used with the present invention such as AND gates 39 and 40 and NAND gate 33 are responsive to negative signals. That is, a negative voltage represents a logical 1 and a zero voltage a logical 0. Thus, the negative voltage at the input to the inverter 37 will result in it having a 0 output. At the zero cross over point, the voltage at point 31 will also be 0 and NAND gate 33 will momentarily have a 1 output at a negative value to reset the sawtooth. The outputs of gates 39 and 40 are also illustrated along with the voltages appearing at terminal points 47 and 49. Note that for the output R to occur, the long pulse must be present along with a negative value at terminal point 47. This, along with the normally negative input to gate 39 from terminal point 52 will result in an output. Similarly, gate 40 will have an $\overline{R}$ output when all of its inputs are logical ones or negative.

Thus, a control unit which is extremely economical to produce and which provides a basic building block which may be used in different applications has been shown. As indicated, with this basic building block, it is only necessary to make a few solder connections in order to obtain the type operation desired. Furthermore, the control unit of the present invention includes means for eliminating the effects of commutation breaks and interference signals so that high pulse accuracy is obtained without special filtering of the synchronizing voltage. With the two pulse control unit illustrated on the figure, the pulse accuracy is, for example, $\pm 0.3°$ and has a shifting range of from 8° to 172°. If it is desired to increase pulse accuracy further, resetting of the sawtooth generator can be accomplished using an interposed operational amplifier or FET switch.

Although a two pulse control unit has been shown as an example in the present embodiment, multi-pulse control units using several assemblies such as that shown may also be provided. These and other modifications may be made without departing from the spirit of the invention which is intended to be limited solely by the appended claims.

What is claimed is:

1. A control unit for a converter, which control unit includes an R-C circuit for generating a sawtooth voltage, means for synchronizing the sawtooth voltage with a synchronizing voltage, an operational amplifier used as a comparator and having the sawtooth voltage as its inverting input and a control voltage as its non-inverting input wherein the improvement comprises:
   a. a diode coupling the sawtooth to the non-inverting input of the comparator with the cathode of said diode connected to the non-inverting input;
   b. a first feedback circuit comprising a capacitor coupling the output of the comparator to its non-inverting input; and
   c. a second feedback circuit comprising a second capacitor and a resistor in series coupling the comparator output to its inverting input.

2. A control unit according to claim 1 and further including a capacitor in series in the output of said comparator.

3. A control unit according to claim 1 and further including means for feeding a blocking voltage to said non-inverting input.

4. A control unit according to claim 1 and further including means to provide a synchronizing input to the sawtooth generator, said means comprising:
   a. means to provide a synchronizing voltage;
   b. means to rectify said synchronizing voltage;
   c. a second R-C circuit coupled to said means to rectify;
   d. a NAND gate having its one input coupled through a diode to said R-C circuit; and c. an inverter coupling the junction between the resistor and capacitor of said R-C circuit to the other input of said NAND gate, the output of said NAND gate being coupled to the junction between the resistor and capacitor in said sawtooth voltage generator R-C circuit.

5. A control unit according to claim 4 wherein said control unit is configured as a two pulse control unit and wherein two synchronizing voltages shifted in phase by 180° are provided as synchronizing inputs.

6. A control unit according to claim 5 wherein the AC power supply voltage is used as the synchronizing voltage.

7. A control unit according to claim 4 and further including:
 a. at least one AND gate having one input coupled to the output of said comparator; and
 b. at least one further R-C circuit having a junction coupled to a second input of said NAND gate and through a diode to said synchronizing voltage.

8. A control unit according to claim 6 and further including:
 a. first and second AND gates; and
 b. first and second R-C circuits each comprising a resistor, a capacitor, and further resistor in series and coupled between positive and negative supply voltages, the negative resistor junction of the first being coupled to the second AND gate and of the second to the first AND gate, with the positive resistor capacitor junction of the first being coupled to the first AND gate and that of the second to the second AND gate with the positive terminal junction of each R-C circuit coupled through a diode to one of said synchronizing voltages.

9. A control unit according to claim 7 and further including NAND gate coupled to the output of said AND gate, said NAND gate having a second terminal to which control signals may be applied.

10. A control unit according to claim 8 and further including first and second NAND gates coupling to the outputs of said first and second AND gates each having a second terminal to which a control voltage may be applied.

* * * * *